(No Model.)
E. McCOY.
LUBRICATOR.
No. 261,166. Patented July 18, 1882.
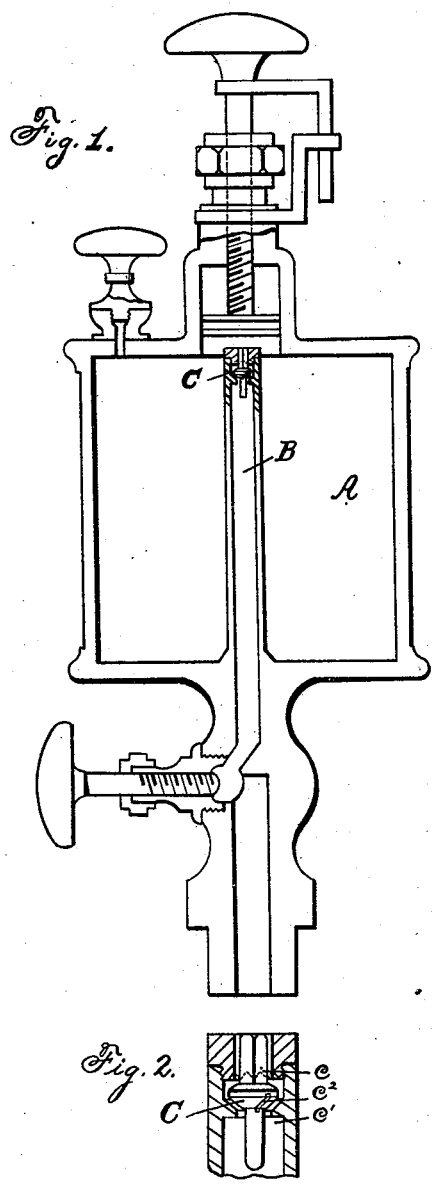
WITNESSES
Samuel E. Thomas.
J. Edward Warren.
INVENTOR
Elijah McCoy
By W.W. Leggett
Attorney

UNITED STATES PATENT OFFICE.

ELIJAH McCOY, OF DETROIT, MICHIGAN, ASSIGNOR TO HENRY C. HODGES AND CHARLES C. HODGES.

LUBRICATOR.

SPECIFICATION forming part of Letters Patent No. 261,166, dated July 18, 1882.

Application filed June 6, 1882. (No model.)

*To all whom it may concern:*

Be it known that I, ELIJAH McCOY, of Detroit city, county of Wayne, State of Michigan, have invented a new and useful Improvement in Lubricators; and I declare the following to be a full, clear, and exact description of the same, such as will enable others skilled in the art to which it pertains to make and use it, reference being had to the accompanying drawings, which form a part of this specification.

My invention consists in the combinations of devices and appliances hereinafter specified, and more particularly pointed out in the claims.

In the drawings, Figure 1 represents in outline a lubricator embodying my invention. Fig. 2 is an enlarged view of the valve mechanism at the top of the oil-exit pipe.

This invention is designed more particularly for use upon locomotive-engines, and in other similar locations.

In the running of a locomotive-engine it is customary, when nearing a station or going down a grade, to shut off the steam from the cylinders, and at such times the "cylinder," as it is termed, works a vacuum.

In ordinary use a steam-engine lubricator has the pressure of steam within it, and it is made to operate under those conditions. In case of a locomotive-engine, however, when it works a vacuum, as above explained, whatever oil there is in the lubricator above the discharge-orifice is instantly sucked out into the cylinder and wasted, and this frequently will operate to empty the cup of its oil.

It is the object of this invention to overcome this difficulty. This can be accomplished by a valve in the oil-exit pipe, which will close tight whenever the piston is working without steam; but it is desirable that at that time enough oil may continue to feed to the cylinder to lubricate it while so operating. So, again, when steam enters the lubricator from the cylinder it is apt to suddenly drive out from the lubricator a quantity of oil, and it is desirable that this should likewise be prevented.

In carrying out my invention, A represents any ordinary steam-cylinder lubricator. B is its discharge-pipe, through which oil flows to the parts to be lubricated. C is a valve located in said discharge-pipe, and preferably at its upper end. This valve is made to seat in both directions, up and down. Its upper seat, however, is serrated in any suitable manner, as shown at $c$, so that the valve cannot seat closely, but will permit quite a free passage past the valve after it has seated at this point. The lower part of the valve seats at $c'$. This seat is made close, but the valve is provided with a small groove, $c^2$.

The operation of the device is substantially as follows: When steam from the cylinder reacts within the lubricator so as to disturb the equilibrium of its contents it will lift this valve C and momentarily hold it up against the upper seat. By so doing the free passage of oil is materially impeded, and any tendency of too great escape at this moment is thereby neutralized, while a sufficient amount is permitted to pass through the serrations $c$ past the valve. Now, when steam is shut off from the cylinder the vacuum produced causes the valve C to close down upon the seat $c'$ below. This prevents the oil from being sucked out from the cup; but the small groove $c^2$ affords an outlet for a sufficient quantity of the oil to lubricate the cylinder when its piston is operating without steam. The valve, being a free check-valve, will wear the seats uniformly, and the groove $c^2$ on the bottom of the valve is at each operation of the valve opened freely, so that oil constantly scours and keeps the passage free and clear. I have found in practice that by far the best results are obtained by locating this valve at the extreme upper end of the oil-exit pipe, in which position the valve is not materially impeded in its operation by a liquid column, such as would exist if it were located lower down in the exit-pipe.

A lubricator made with this valve mechanism will lubricate an engine through a much longer travel and with much less oil than if the valve be omitted.

Instead of grooving the face of the lower valve, its seat may be grooved, though I prefer to make the groove in the face of the valve. The serrations $c$ being immediately adjacent to the valve, it follows that in the ordinary operations of the cup no column of oil rests upon the valve, but the column is wasted from its base.

What I claim is—

1. The combination, with a lubricator, of a double valve in its oil-exit conduit, said valve provided with an upper serrated seat, and the valve itself grooved in its lower face or seat, substantially as and for the purpose described.

2. The combination, with a lubricator, of an oil-exit pipe provided with a double valve at its upper extremity, said valve provided with an upper serrated seat and with a groove on the lower face of the valve or its seat, substantially as and for the purpose described.

In testimony whereof I sign this specification in the presence of two witnesses.

ELIJAH McCOY.

Witnesses:
J. EDWARD WARREN,
SAMUEL E. THOMAS.